(12) United States Patent
Xu et al.

(10) Patent No.: US 11,818,679 B2
(45) Date of Patent: *Nov. 14, 2023

(54) METHOD AND APPARATUS FOR DATA TRANSPORT CONTROL BETWEEN WIRELESS NETWORK SYSTEMS

(71) Applicant: Samsung Electronics Co., Ltd., Suwon-si (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

This patent is subject to a terminal disclaimer.

(21) Appl. No.: 17/122,937

(22) Filed: Dec. 15, 2020

(65) Prior Publication Data

US 2021/0105734 A1 Apr. 8, 2021

Related U.S. Application Data

(63) Continuation of application No. 16/340,875, filed as application No. PCT/KR2018/000295 on Jan. 5, 2018, now Pat. No. 10,904,850.

(30) Foreign Application Priority Data

Jan. 6, 2017 (CN) .......................... 201710010771.2

(51) Int. Cl.
*H04W 60/04* (2009.01)
*H04W 48/18* (2009.01)
(Continued)

(52) U.S. Cl.
CPC ........... *H04W 60/04* (2013.01); *H04W 36/14* (2013.01); *H04W 48/16* (2013.01); *H04W 48/18* (2013.01);
(Continued)

(58) Field of Classification Search
CPC ... H04W 28/04; H04W 72/04; H04W 72/042; H04W 88/08; H04W 60/04; H04W 48/18;
(Continued)

(56) References Cited

U.S. PATENT DOCUMENTS 8,774,129 B2 7/2014 De Benedittis et al.
9,380,510 B2 6/2016 Kim
(Continued)

FOREIGN PATENT DOCUMENTS

CN 102761920 A 10/2012
CN 104322094 A * 1/2015 ............ H04W 24/08
(Continued)

OTHER PUBLICATIONS

3GPP TR 23.799 v14.0.0 (Dec. 2016), 3rd Generation Partnership Project; Technical Specification Group Services and System Aspects; Study on Architecture for Next Generation system (Release 14). (Year: 2016).*
(Continued)

*Primary Examiner* — Peter G Solinsky
*Assistant Examiner* — Sanjay K Dewan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

There is provided a method and apparatus for data transport control between wireless network systems, the method comprises: determining, by a first node, whether a predetermined
(Continued)

condition is satisfied; and transmitting, by the first node, at least one of data transport command information and user equipment access information when the predetermined condition is satisfied.

18 Claims, 11 Drawing Sheets

(51) Int. Cl.
*H04W 36/14* (2009.01)
*H04W 48/16* (2009.01)
*H04W 80/10* (2009.01)
*H04W 88/10* (2009.01)
*H04W 48/02* (2009.01)

(52) U.S. Cl.
CPC .......... *H04W 80/10* (2013.01); *H04W 88/10* (2013.01); *H04W 48/02* (2013.01)

(58) Field of Classification Search
CPC ..... H04W 36/14; H04W 80/10; H04W 88/10; H04W 48/16; H04W 48/02; H04W 72/11; H04W 72/115; H04W 72/40; H04W 72/23; H04L 5/0007
USPC ......................................... 370/329
See application file for complete search history.

(56) References Cited

U.S. PATENT DOCUMENTS

| | | | |
|---|---|---|---|
| 9,693,381 B2 | 6/2017 | Jamadagni et al. | |
| 11,019,668 B2* | 5/2021 | Talebi Fard | H04W 60/04 |
| 11,160,006 B2* | 10/2021 | Zaus | H04W 60/00 |
| 2008/0299966 A1 | 12/2008 | Masuda | |
| 2010/0035581 A1 | 2/2010 | Park et al. | |
| 2010/0150083 A1 | 6/2010 | Toda et al. | |
| 2011/0126041 A1 | 5/2011 | Matsubara | |
| 2011/0188379 A1 | 8/2011 | Calippe et al. | |
| 2015/0365894 A1 | 12/2015 | Bai et al. | |
| 2016/0135174 A1 | 5/2016 | Lee et al. | |
| 2017/0223595 A1 | 8/2017 | Fukuta | |
| 2017/0245180 A1 | 8/2017 | Lim et al. | |
| 2018/0234903 A1 | 8/2018 | Jheng et al. | |
| 2019/0150219 A1* | 5/2019 | Wang | H04W 76/30 370/329 |
| 2019/0166647 A1* | 5/2019 | Velev | H04W 80/10 |
| 2019/0253935 A1* | 8/2019 | Huang-Fu | H04W 36/14 |
| 2019/0306754 A1* | 10/2019 | Shan | H04W 8/06 |
| 2019/0335534 A1* | 10/2019 | Atarius | H04M 15/66 |
| 2020/0053638 A1* | 2/2020 | Edge | H04W 4/029 |
| 2020/0068449 A1* | 2/2020 | Jin | H04W 36/18 |
| 2021/0385714 A1* | 12/2021 | Paladugu | H04W 36/18 |
| 2022/0141719 A1* | 5/2022 | Shan | H04W 36/0055 370/331 |

FOREIGN PATENT DOCUMENTS

| | | | | | |
|---|---|---|---|---|---|
| CN | 104854918 | A | * | 8/2015 | .......... H04L 1/1854 |
| CN | 105009678 | A | * | 10/2015 | .......... H04L 5/0032 |
| CN | 105792105 | A | | 7/2016 | |
| CN | 105813079 | A | * | 7/2016 | ............ H04W 12/06 |
| EP | 2529569 | B1 | | 10/2019 | |
| KR | 10-2010-0086722 | A | | 8/2010 | |
| KR | 10-2011-0054381 | A | | 5/2011 | |
| KR | 10-2011-0127280 | A | | 11/2011 | |
| KR | 10-2015-0021261 | A | | 3/2015 | |
| KR | 10-2015-0024689 | A | | 3/2015 | |
| KR | WO 2016/036056 | A1 | * | 3/2016 | ............ H04W 36/08 |
| WO | 2015125698 | A1 | | 8/2015 | |
| WO | 2015145275 | A1 | | 10/2015 | |
| WO | 2016036056 | A1 | | 3/2016 | |
| WO | 2016064197 | A1 | | 4/2016 | |
| WO | 2018128477 | A1 | | 7/2018 | |

OTHER PUBLICATIONS

Notice of Non-Final Rejection dated Aug. 4, 2021, in connection with Korean Patent Application No. 2019-7009357, 11 pages.
The Second Office Action dated May 20, 2021, in connection with Chinese Patent Application No. 201710010771.2, 18 pages.
3rd Generation Partnership Project; Technical Specification Group Services and System Aspects; Study on Architecture for Next Generation System (Release 14) 3GPP TR 23.799 V14.0.0, Dec. 2016, 26 pages.
Notice of Allowance dated Feb. 8, 2022, in connection with Korean Application No. 10-2019-7009357, 9 pages.
ISA/KR, "International Search Report and Written Opinion of International Searching Authority," International Application No. PCT/KR2018/000295, dated Apr. 11, 2018, 9 pages.
"The First Office Action" dated Nov. 19, 2020 in connection with Chinese Application No. 201710010771.2, 21 pages.
China National Intellectual Property Administration, "Office Action" dated Apr. 26, 2023 in connection with Chinese Patent Application No. 202111393486.6, 12 pages.
ZTE, "3GPP architecture framework proposal for Next Generation Network Architecture with Access Independent Core," SA WG2 Meeting #113AH, S2-161200, 11 pages.
3GPP TR 23.799 V1.2.1 (2016-11), Technical Report, 3rd Generation Partnership Project; Technical Specification Group Services and System Aspects; Study on Architecture for Next Generation System (Release 14); 453 pages.

\* cited by examiner

METHOD AND APPARATUS FOR DATA TRANSPORT CONTROL BETWEEN WIRELESS NETWORK SYSTEMS

CROSS-REFERENCE TO RELATED APPLICATIONS

This application is a continuation of application Ser. No. 16/340,875, which is the 371 National Stage of International Application No. PCT/KR2018/000295, filed Jan. 5, 2018, which claims priority to Chinese Patent Application No. 201710010771.2, filed Jan. 6, 2017, the disclosures of which are herein incorporated by reference in their entirety.

BACKGROUND

1. Field

The present disclosure relates to a wireless communication technology, and more particularly, to a method and apparatus for data transport control between wireless network systems.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communication tends to provide multimedia services transported in a high data rate for users.

FIG. 1 is a schematic diagram of a system architecture of System Architecture Evolution (SAE). A user equipment (UE) 101 may be a terminal equipment supporting a network protocol. An evolution universal terrestrial wireless access network (E-UTRAN) 102 is a wireless access network, which includes a base station (eNodeB/NodeB) to provide an interface for accessing to a wireless network for the UE. A mobile management entity (MME) 103 is responsible for managing a mobile context, a session context and security information of the UE. A service gateway (SGW) 104 primarily provides a function of a user plane, and the MME 103 and the SGW 104 may be in the same physical entity. A packet data network gateway (PGW) 105 is responsible for charging, lawful interception and other functions, and may also be in the same physical entity with the SGW 104. A policy and charging rule functional entity (PCRF) 106 provides a quality of service (QoS) policy and charging rules. A Serving GPRS Support Node (SGSN) 108 is a network node equipment in a Universal Mobile Telecommunications Service (UMTS) to provide routing for a transport of data. A Home Subscriber Server (HSS) 109 is a home subsystem of the UE and is responsible for protecting user information of the UE such as a current location, an address of a service node, user security information, a packet data context of the user equipment and so on.

FIG. 2 is a schematic diagram of an initial system architecture of a next generation network (5G). The architecture includes a NextGen UE 201, a NextGen Access Network or NextGen Radio Access Network (Next Gen (R)AN) 202, a NextGen core 203 and a data network 204. A control plane interface between the Next Gen (R)AN and the NextGen Core is NG2, and a user plane interface therebetween is NG3. However, it should be understood that names of these interfaces are only temporary names, and these interfaces can also be named with other names according to a final decision of 3GPP and other institutions. Moreover, NextGen core further includes a user plane functional entity and a control plane functional entity.

SUMMARY

In the foreseeable future, there will be more and more electrical equipments that are intellectualized and living accessories that are interconnected, and all have a function of network access. On the one hand, a part of future UEs often has the following characteristics: being static or being low mobility, and low-cost, and the transceived data is often in a small amount and is discontinuous. For these UEs, signaling overheads caused by connection establishment and release are much larger than the amount of the transceived data. On the other hand, in order to support more and more real-time applications such as virtual reality etc., an access delay of a future mobile communication network needs to be reduced greatly. To save signaling overhead, improving an efficiency of data transport, and reducing a delay of network access of the UE, are required in the network imperatively.

According to an aspect of the present disclosure, there is provided a method for data transport control between wireless network systems, which includes: determining, by a first node, whether a predetermined condition is satisfied; and transmitting, by the first node, at least one of data transport command information and user equipment access information when the predetermined condition is satisfied.

The first node may include at least one of a node of a first network, a node of a second network, a radio access network node of the first network, a core network node of the first network, a radio access network node of the second network, a core network node of the second network, a user equipment, and a common user plane data endpoint shared by the first and second networks.

The predetermined condition may include at least one of a data transport starting condition for a certain network; and a data transport stopping condition for the certain network, wherein the certain network is one of the first and second networks.

The data transport starting condition for the certain network may include at least one of conditions that the user equipment accesses to the certain network; the user equipment leaves or is leaving other network other than the certain network; the user equipment leaves or is leaving another network of the first and second networks; the user equipment and the user plane data endpoint has established a session via the certain network; and the user equipment and the user plane data endpoint has established a user equipment session or a session channel via other network other than the certain network. The data transport stopping condition for the certain network may include at least one of conditions that the user equipment leaves or is leaving the certain network; and the user equipment has accessed to other network other than the certain network.

The predetermined condition may further include an acquisition of radio access capacity information related to the access of the UE.

The data transport command information may include at least one of data transport starting information, data transport stopping information, data transport switching information, target session channel information of the data transport, and an UE identification. The user equipment access information may include at least one of network information related to a network to which the user equipment accesses, session information related to a session to which the user equipment accesses, and channel information related to a session channel to which the user equipment accesses.

The data transport command information may be transmitted by using a signaling message of a control plane or data of a user plane. The data transport starting information may include at least one of data transport starting indication information, an identification of a network in which the data transport starts, network information of a network in which the data transport starts, information of a session in which the data transport starts, and channel information of a session channel in which the data transport starts; and/or, the data transport stopping information may include at least one of data transport stopping indication information, network information of a network in which the data transport stops, information of a session in which the data transport stops, and channel information of a session channel in which the data transport stops; and/or, the data transport switching information may include at least one of data transport switching indication information, information of a session of which the data transport switches, network information of a target network of the data transport, session information of the target network of the data transport, channel information of a target session channel of the data transport, network information of a source network of the data transport, session information of a source session of the data transport, and channel information of a source session channel of the data transport.

The session information related to a session to which the user equipment accesses may include at least one of a user equipment identification, information indicating whether the user plane data endpoint of the session of the user equipment is the common user plane data endpoint, an identification of a user equipment session, an IP address of a user equipment in the user equipment session, information of the user plane data endpoint of the user equipment session, and network information of a network in which a user equipment session channel is established; and/or, the channel information may include at least one of a session identification, an uplink transport layer address of the channel, an uplink endpoint identification of the channel, a downlink transport layer address of the channel, and a downlink endpoint identification of the channel; and/or, the network information may include at least one of a network type and a network identification.

According to another aspect of the present disclosure, there is provided a method for data transport control between wireless network systems, which includes: receiving, by a second node, at least one of data transport command information and user equipment access information; and controlling, by a second node, to perform a corresponding data transport operation according to the received at least one information.

The second node may include at least one of a user plane data endpoint, a user equipment, a radio access network node and a core network node.

The data transport command information may include at least one of data transport starting information, data transport stopping information, data transport switching information, and target session channel information of the data transport. The user equipment access information may include at least one of network information related to a network to which the user equipment accesses, session information related to a session to which the user equipment accesses, and channel information related to a session channel to which the user equipment accesses.

The data transport operation may include at least one of an operation of starting the data transport and an operation of stopping the data transport.

According to another aspect of the present disclosure, there is provided an apparatus for data transport control between wireless network systems, which includes: a condition detecting unit configured to determine whether a predetermined condition is satisfied; and an information transmitting unit configured to transmit at least one of data transport command information and user equipment access information when the predetermined condition is satisfied.

According to another aspect of the present disclosure, there is provided an apparatus for data transport control between wireless network systems, which includes: an information receiving unit configured to receive at least one of data transport command information and user equipment access information; and a data transport control unit configured to perform a corresponding data transport operation according to the received at least one by the information receiving unit.

According to an exemplary embodiment of the present disclosure, a dual attachment is achieved in two networks via the UE, and the UE and the common user plane data endpoint establish data channel in the two networks, respectively, in this way, on one hand, a loose interoperation between network systems may realized, and on the other hand, a data continuity and business continuity of the UE may be maintained when the UE moves between network systems. Besides, since the next generation network is mostly deployed in hot-spots on the basis of a complete coverage of the existing network, with the movement of the UE, the UE may frequently move among different network systems. According to a technical solution of the exemplary embodiment of the present disclosure, it may contribute to increase a throughput rate of the UE by taking advantage of the next generation network on one hand, besides, it may not cause too much signaling overheads caused by frequently switches between two networks while the UE moving as a result of introducing the next generation network, thereby facilitating a rapid application of the next generation network.

DETAILED DESCRIPTION

In order for the purpose, technical means and advantages of the present application to be more clear, the present application will be described in details with reference to the figures below.

Figure 1:
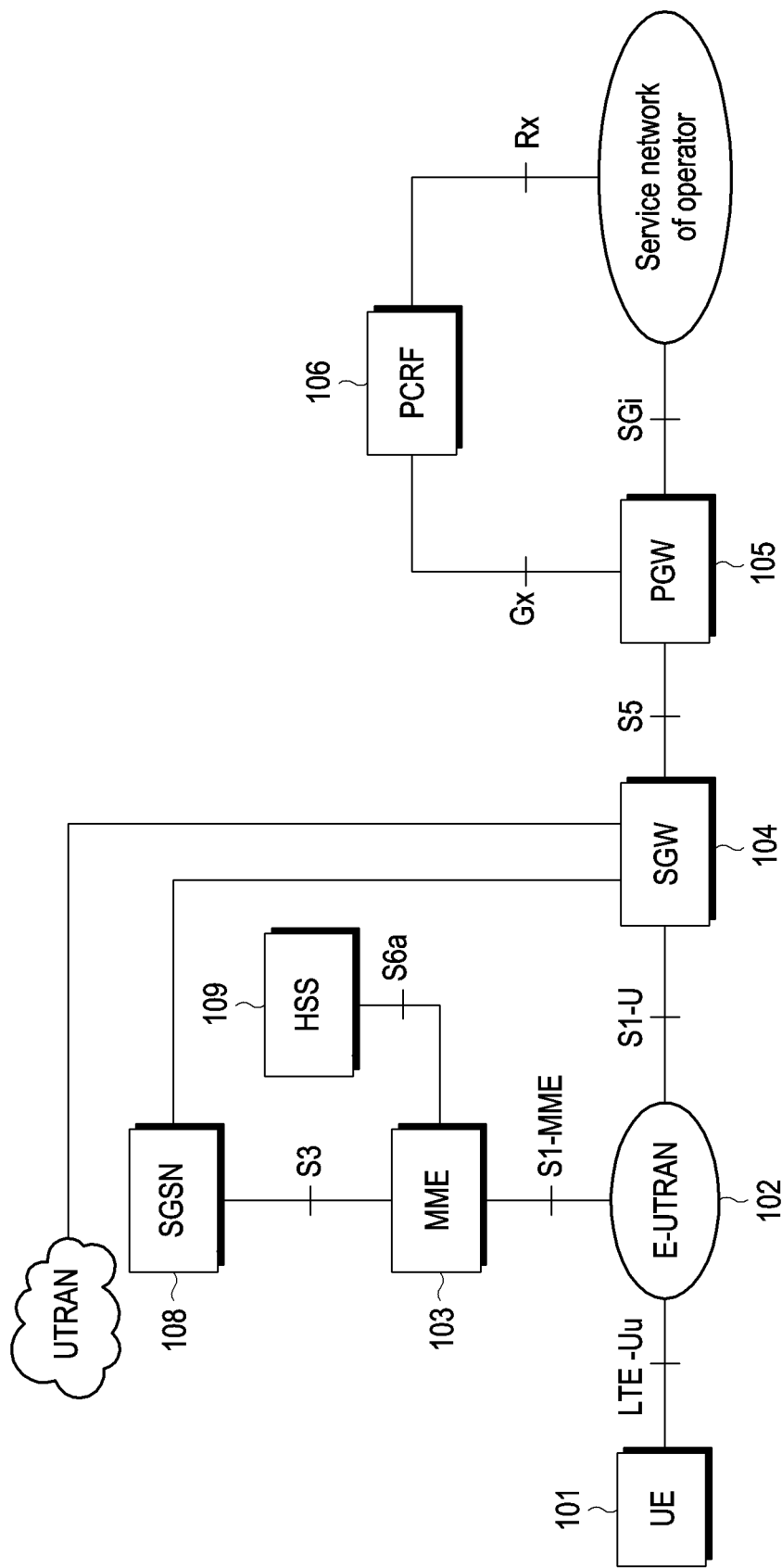
FIG. 1 is a schematic diagram of a system architecture of System Architecture Evolution (SAE)
Figure 2:
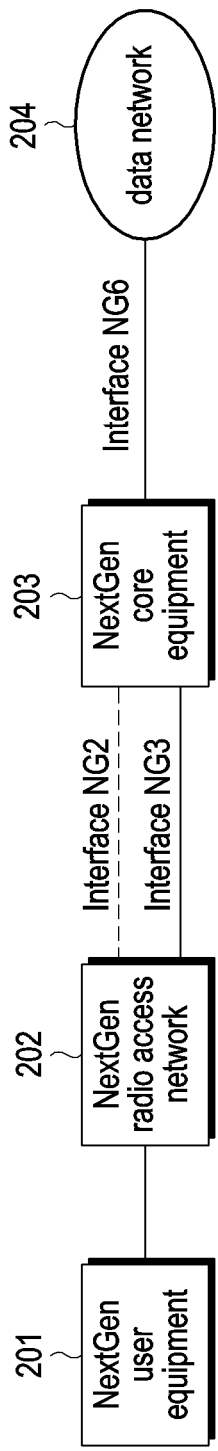
FIG. 2 is a schematic diagram of an initial system architecture of a next generation network (5G/NR)
Figure 3:
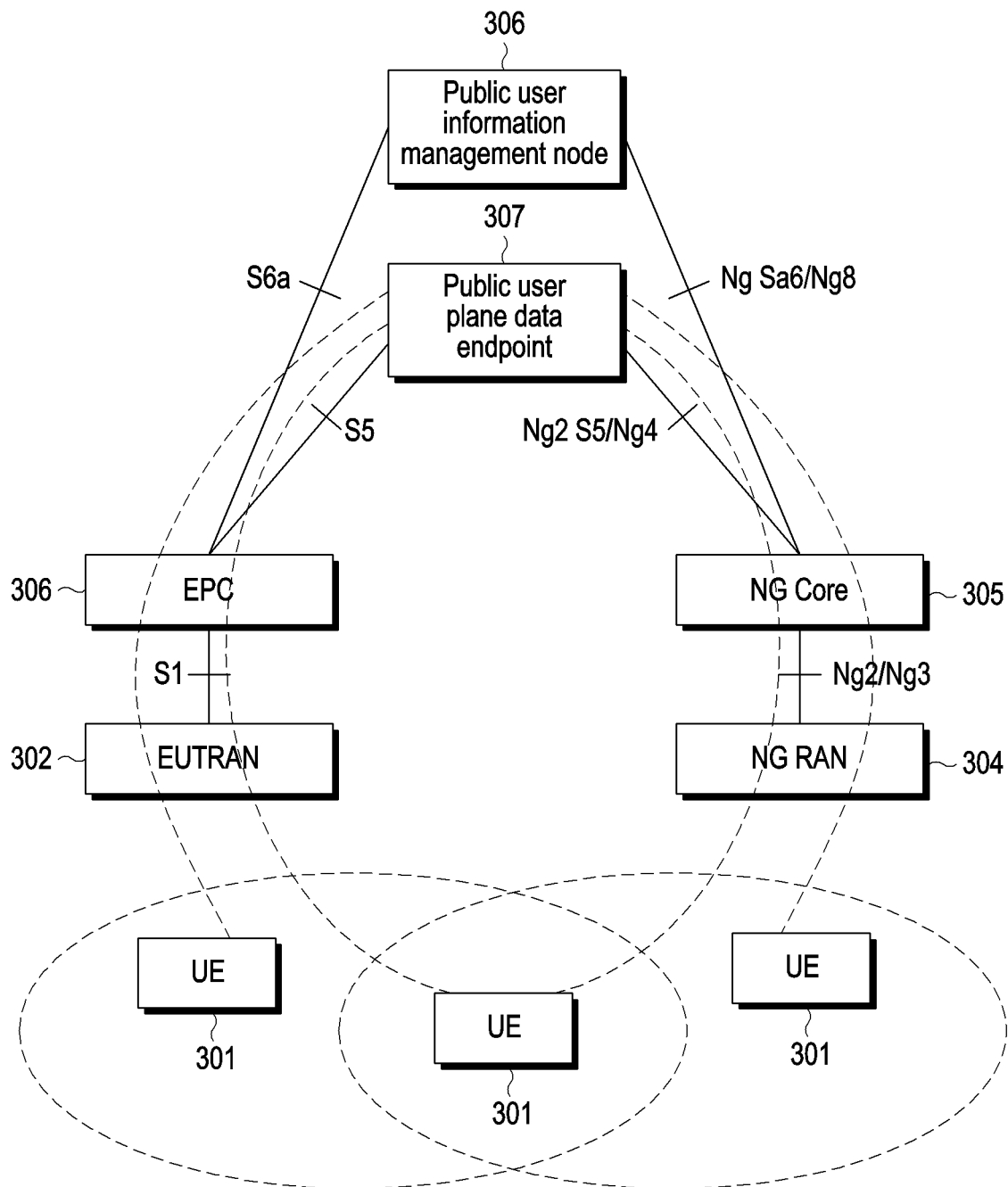
FIG. 3 is a schematic diagram of an architecture between a fourth generation network system (EPC/SAE) and a next generation network system (5G/NR)

FIG. 3 is a schematic diagram of an architecture between a fourth generation network system (EPC/SAE) and a next generation network system (5G/NR 5th Generation/Next radio). The architecture in FIG. 3 includes a user equipment 301, an EUTRAN (Evolved Universal Terrestrial Radio Access Network) 302, an EPC (Evolved Packet Core) 303, a Next Generation Radio Access Network (Next Gen (R)AN) 304, a Next Generation Core network (NextGen Core) 305, a public HSS UDM (User Data Management) 306 and a public PGW 307. The public HSS 306 and the public PGW/TUPF (Termination User Plane Function) are shared by two network systems (that is, the existing network system (EPC/SAE) and the next generation network system (5G/NR)). An interface between the EUTRAN 302 and the EPC 303 is S1; and a control plane interface between the Next Gen (R)AN 304 and the NextGen Core 305 is NG2, and a user plane interface therebetween is NG3. An interface between the EPC 303 and the public HSS/UDM 306 is S6a; and an interface between the NextGen Core 305 and the public HSS/UDM 306 is NG S6a or Ng8. An interface between the EPC 303 and the public PGW/TUPF 307 is S5, and an interface between the NextGen Core 305 and the public PGW/TUPF 307 is NG S5 or Ng4. However, it should be understood that names of these interfaces are only temporary names, and these interfaces can also be named with other names according to a final decision of 3GPP and other institutions.

In the deployment of the future next generation network, it is foreseeable that it will coexist with the existing network and is deployed more in hot-spot areas. The UE moving back and forth between two networks may be a common scenario. In general, when the UE moves between network systems, a data interrupt may occur due to the change of the user plane data endpoint (for example, PGW). In order to maintain the continuity of data or continuity of service, and reduce a loss of data, a common user plane data endpoint (for example, PGW) may be deployed in two networks. When the UE switches between the two networks, the user plane data endpoint is not changed, thereby the continuity of the data may be maintained.

If there is no interface between the two networks, it is impossible to switch between the networks. This would be a common scenario in a preliminary stage of the deployment of the next generation network, that is because a large scale upgrade works is necessary for the requirement that the existing network supports an interface of the next generation network.

To avoid data loss, there is provided a dual attachment technical solution. First, it needs to keep that the user plane data endpoint (for example, PGW) of the UE is not changed in a first network, that is, the user plane data endpoint is used as an anchor; Next, during the connection establishment between the UE and a second network, the UE still keeps connection with the first network and continues to receive and transmit data via the first network. This mechanism requires the UE to be attached to two networks simultaneously and establish a connection with the same anchor user plane data endpoint via the two networks, thus it is also known as dual attachment or dual connection. When a session establishment between the UE with the second network is completed, the data transport between the UE and the anchor user plane data endpoint is switched to a channel of the second network and continue to transmit cached data to the UE. This technical solution will be named in other ways subsequently, but it's naming patterns do not have impact on the main content and scope of the present disclosure.

In addition, if there is an interface between two network entities, the UE may also apply a dual attachment manner to reduce overheads of network signalings. That is because a switching between network systems may cause much more signaling overheads. The dual attachment is a manner of loss interoperation between network systems.

However, the above dual attachment manner also has the following disadvantages:

1. when the UE is moved and then attached to the second network after being attached to the first network, the UE may move back to the first network subsequently. In this case, the UE has established a session from the first network to the common user plane data endpoint, thus a process for establishing a session is unnecessary. However, the common user plane data endpoint is not aware that the UE moves and continues to transmitting data to the UE via the second network. The data transmitted to the second network may not be continuously received by the UE. These data is lost, and the data continuity cannot be guaranteed.

2. If the UE can only access to a single radio network, when the UE moves from the first network to the second network, in a period from a time when the UE receives a dual attachment operation instruction to a time when the UE is attached to the second network and establishes a session with the common user plane data endpoint via the second network, the user plane data endpoint is not aware that the UE does not receive data in the first network, but it keeps on transmitting data to the first network. These data will be lost, and the data continuity cannot be guaranteed.

3. When the user plane data endpoint receives a session establishment request regarding the UE, it may not automatically associate the context of the existing session of the UE. As for the session establishment request regarding the UE received from the second network, if the user plane data endpoint assigns an IP address to the UE that is different from an IP address assigned to the UE in the first network, the data continuity will be interrupted.

4. When the UE is attached to the two networks and the UE is in an idle state or an inactive state, the user plane data endpoint receives downlink data of the UE, but it is not clear how to trigger a paging. The UE may respond to the paging in the first network, and may also respond to the paging in the second network. If the data is directly transmitted to a certain network but the UE is accessed from another network, which will result in a data loss. If the data is not transmitted to a certain network, when the UE is accessed from a network, the user plane data endpoint is not aware the state of the UE and from which network the UE is accessed, thus it still cannot transmit the data to the network from which the UE is accessed.

Below the embodiments of the present disclosure will be described in details, and examples of the embodiments are shown in the figures, wherein the same or similar symbols represent the same or similar components or components having the same or similar functions throughout. The following embodiments illustrated by referring to the figures are exemplary, and are merely used to explain the present disclosure but cannot be construed as a limitation to the present disclosure.

Those skilled in the art can understand that, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the existing art and will not be interpreted in an idealized or overly formal sense unless expressly so defined herein.

For ease understanding of the technical solution of the present disclosure, it is necessary to make the following guiding explanations to the principle and corresponding terms in the present disclosure.

Explanations to some terms in the document are as follows:

In some embodiments, the core network node may be MME, SGSN, SGW, CCNF, AMF, SMF etc., a core network control node (such as MME, CCNF, AMF), a core network user plane node (SMF, UDF), a core network control plane function, a core network user plane function, a core network control plane unit, a core network user plane unit and so on. In the next generation network, a conception of the node can be virtualized as a function or a unit.

In some embodiments, the core network control node may be at least one of MME (Mobility Management Entity), SGSN, core network control plane function, core network control plane unit, CCNF (Common Control Network Function), AMF (Access and Mobility Function), SMF (Session Management Function) and so on.

In some embodiments, the core network user plane node may be at least one of SGW, SGSN, core network user plane function (UPF), core network user plane unit, network slice and so on.

In some embodiments, the UE information management node may be at least one of HSS and UDM.

In some embodiments, the user plane data endpoint may be at least one of PGW, UPF and TUPF. The anchor user plane data endpoint of an UE session may be a user plane data endpoint selected when establishing the UE session.

Data mentioned in the document may includes data of the control plane (such as NAS signaling, TAU Request, Service Request, user plane data transmitted by using a data packet of the control plane and so on) or data of the user plane. An indication regarding whether there is data to be transmitted may be further divided into an indication regarding whether there is a need to transmit uplink control plane data and an indication regarding whether there is a need to transmit uplink user plane data. The indication regarding whether there is data to be transmitted may also be further divided into an indication regarding whether there is a need to transmit uplink data and an indication regarding whether there is a need to transmit downlink data.

However, it should be understood that the above definitions and explanations to the terms are merely exemplary, and the definitions and scopes of the above terms may also have much broad explanations with the development of technologies.

Below, exemplary embodiments of the present application will be described in details with reference to the accompanying drawings. Hereinafter, to facilitate explanation, it is assumed that the UE moves between a first network and a second network, and the UE is in a dual attachment state with respect to the first and second networks (that is, the UE is attached to the first and second networks simultaneously).

Figure 4A:
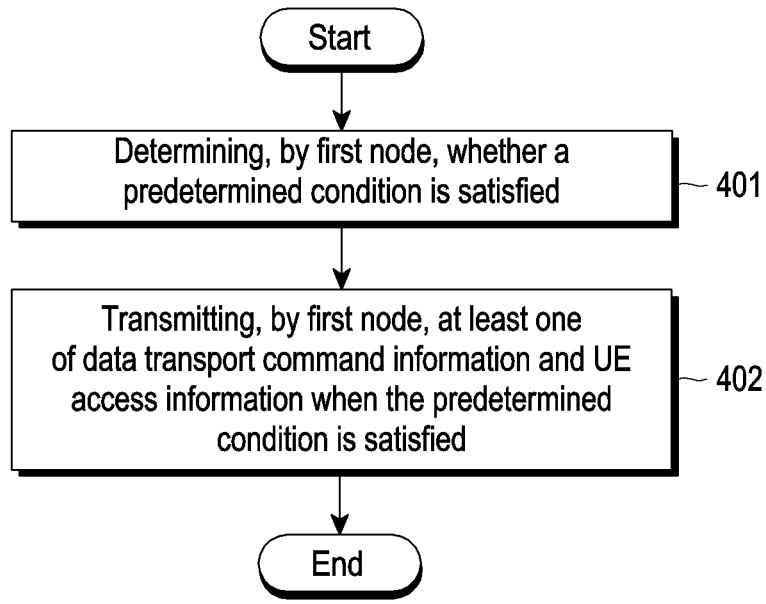
FIG. 4A is a flowchart diagram of a method for data transport control between wireless network systems according to an exemplary embodiment of the present disclosure.

FIG. 4A is a flowchart diagram of a method for data transport control between wireless network systems according to an exemplary embodiment of the present disclosure.

As shown in FIG. 4A, the flowchart includes:

In step 401, a first node determines whether a predetermined condition is satisfied.

Alternatively, the first node may refer to one of a node of a first network, a radio access network node of the first network, a core network node of the first network, a radio access network node of a second network, a node of the second network, a core network node of the second network, a radio access network node, a core network node, an UE, and a user plane data endpoint.

In some embodiments, the user plane data endpoint may be a common user plane data endpoint shared by the first and second networks or an anchor user plane data endpoint of the UE. In some embodiments, the anchor user plane data endpoint of the UE may be in an UE level or an UE session level. The anchor user plane data endpoint of an UE session refers to a user plane data endpoint on which a UE session is established. When the UE moves among different networks, the user plane date endpoint stays unchanged for the UE or the UE session. The UE may establish a data channel regarding the UE or the UE session between the UE and the user plane data endpoint in different networks. For example:

Method 1: when the UE requests to establish a session for the UE in different networks successively, the UE provides the same UE session identifications and the networks select the same user plane data endpoints, thus by a correlation of the same session identification, two channels, i.e. a channel for the UE session in the first network and a channel for the UE session in the second network, exist between the UE and the anchor user plane data endpoint; and Method 2: when the UE requests to establish a session for the UE in different networks successively, the UE provides a first session identification (of the session established previously) and a second session identification (of the session established currently) and the networks select the same user plane data endpoint, thus by a correlating the first session identification with the second session identification, two correlated UE session channels exist in the first and second networks between the UE and the anchor user plane data endpoint. The channels of the two networks may be in an activated state simultaneously, or one is activated but another one is inactivated. The activated data channel may receive and transmit data. The inactivated channel cannot receive and transmit data, such as a channel whose resources and connection have been released in a wireless side.

Alternatively, the predetermined condition includes at least one of a data transport starting condition for the first network, a data transport stopping condition for the first network, and an acquisition of radio access capacity information related to the access of the UE.

Alternatively, the data transport starting condition for the first network includes at least one of conditions that
the UE accesses to the first network, for example, at least one of the following cases:
the UE accesses to the first network in response to a paging of the first network, for example, the UE receives a connection establishment request or a connection recovery request;
a connection between the UE and the first network is established or recovered, and the UE positively accesses to the first network from an idle state or an inactive state to request recovering of a connection with the network;
the UE is attached to the first network;
the UE switches or moves to the first network from other network;
the UE or the UE session is established or recovered in the channel of the first network;
the first network is a target network of the UE, for example,
a handover event or a reselection event between networks occurs, and the target network is the first network;
the UE is leaving or has already left other network (for example, the second network) other than the first network, for example,
a handover event or a reselection event between networks occurs, and the source network is other network other than the first network;
a UE session or a UE session channel has been established between the UE and the user plane data endpoint via the first network, for example, the UE has established a data channel regarding the session with the user plane data endpoint shared by the first and second networks in the first network. The user plane data endpoint may be a common user plane data endpoint or an anchor user plane data endpoint of the UE session.
a UE session or a channel of a UE session has been established between the UE and the user plane data endpoint via the second network. The user plane data endpoint may be a common user plane data endpoint or an anchor user plane data endpoint of the UE session.

In some embodiments, the UE establishes channels regarding the UE or the UE session between the UE and the user plane data endpoint in the first and second networks, respectively. When the UE leaves the second network, which is equivalent that the UE will access to the first network.

Alternatively, the data transport stopping condition for the first network includes at least one of conditions that:
the UE is leaving or has already left the first network, for example,
a handover event or a reselection event between networks occurs, and the other network is a target network, for example,
the first node deploys the UE to perform a dual attachment operation or switching between networks.

The first node receives that the UE starts to perform the dual attachment operation or the switching between networks from other nodes. The other nodes may be one of a radio access network node, a core network node, and an UE.

An UE wireless connection between the UE and the first network is disconnected or suspended, for example, the UE in the first network enters into an idle state or an inactive mode.

The UE is detached from the first network (that is, the attachment is removed).
the UE cannot support receiving and sending data via the first and second network simultaneously.
the radio access capacity information of the UE is a single access. In some embodiments, when the UE of a single access is ready to leave the first network, the data transport of it in the first network needs to be stopped, so as to reduce a loss of data. Alternatively, the radio access capacity information of the UE may include at least one of the access information in the following types: single radio-access, time division multiplexing single radio-access, and dual radio-access. Further, the first node may obtain the radio access capacity information of the UE from other nodes. The other nodes may be a radio access network node, a core network node and/or an UE.

the UE accesses to other network other than the first network, for example, the UE accesses to the second network.

In some embodiments, the UE establishes channels regarding the UE or the UE session between the UE and the user plane data endpoint in the first and second networks, respectively. The two channels may be activated simultaneously, or one is activated but another one is inactivated. When the UE accesses to the second network, which is equivalent that the UE leaves the first network.

Alternatively, an acquisition of the radio access capacity information related to the access of the UE includes at least one of whether to support a dual attachment, whether to support a signal radio access, whether to support a time division multiplexing single radio-access, whether to support a dual radio access, network information of a network supporting the simultaneous attachment, and network information of a network not supporting the simultaneous attachment.

In step 402, when the predetermined condition is satisfied, the first node transmits at least one of the data transport command information and the UE access information.

Alternatively, the data transport command information may include at least one of data transport starting information, data transport stopping information, data transport switching information, channel information of a target session channel of the data transport, and an UE identification.

Alternatively, the UE access information may include at least one of network information of a network to which the UE accesses, session information of a session to which the UE accesses, and channel information of a session channel to which the UE accesses.

Alternatively, the channel information may include at least one of a session identification, an uplink transport layer address of the channel, an uplink endpoint identification of the channel (such as TEID, Tunnel end point ID), a downlink transport layer address of the channel, and a downlink endpoint identification of the channel.

Alternatively, the data transport starting information may include at least one of data transport starting indication, an identification of a network in which data transport starts, network information of a network in which the data transport starts, information of a session in which the data transport starts, and channel information of a session channel in which the data transport starts (the content herein is the same as the aforementioned channel information, thus the description thereof is omitted here).

Alternatively, the session information of the UE may include at least one of an UE identification, information indicating whether the user plane data endpoint of the session of the UE is the common user plane data endpoint, an identification of an UE session, an IP address of the UE in a UE session, information of the user plane data endpoint of the UE session, network information of a network in which a UE session channel is established, channel information of the first channel of the session (the content herein is the same as the aforementioned channel information, thus the description thereof is omitted here), and channel information of the second channel of the session (the content herein is the same as the aforementioned channel information, thus the description thereof is omitted here). The user plane data endpoint of the UE session may also be named as an anchor user plane data endpoint of the UE session. The contents of the session information of a session in which the data transport starts and the session information of the session to which the UE accesses are the same as the above described session information of the UE, thus the description thereof are omitted here.

Alternatively, the network information may include at least one of network type (such as GERAN, UMTS, EUTRAN, EPC, 5G/NR, NR Core) and network identification (such as PLMN). The contents of the network information of the network in which the data transport starts and the network information of the network in which a UE session channel is established are the same as the aforementioned contents, thus the description thereof are omitted here).

Alternatively, the data transport stopping information may include at least one of data transport stopping indication information, network information of a network in which the data transport stops (wherein content involved in the network information of a network in which the data transport stops is the same as the aforementioned content of the network information, there is no more detailed explanation for conciseness), information of a session in which the data transport stops (which is the same as the aforementioned session information of the UE, thus the description thereof is omitted here), and channel information of a session channel in which the data transport stops (which is the same as the aforementioned channel information, thus the description thereof is omitted here).

Alternatively, the data transport switching information may include at least one of data transport switching indication information, information of a session of which the data transport switches (which is the same as the aforementioned session information of the UE, thus the description thereof is omitted here), network information of a target network of the data transport, session information of the target network of the data transport (which is the same as the aforementioned session information of the UE, thus the description thereof is omitted here), channel information of a target session channel of the data transport (which is the same as the aforementioned channel information, thus the description thereof is omitted here), network information of a source network of the data transport (which is the same as the aforementioned network information of the UE, thus the description thereof is omitted here), session information of a source session of the data transport (which is the same as the aforementioned session information of the UE, thus the description thereof is omitted here), and channel information of a source session channel of the data transport (which is the same as the aforementioned channel information, thus the description thereof is omitted here). In some embodiments, there are two associated sessions existing in two networks respectively between the UE and the anchor user plane data endpoint. When the data transport is switched, there are the source session channel information of the data transport and the target session channel information of the data transport. In some another embodiments, there are two channels of the same session existing in two networks between the UE and the anchor user plane data endpoint. When the data transport is switched, the source session information and the target session information are the same, which are the information of the session in which the data transport switches. In some embodiments, when the predetermined condition is the data transport starting condition for the first network and the predetermined condition is satisfied, the first node transmits at least one of the data transport starting information related to the first network, wherein the data transport starting information may be transmitted in at least one of the following ways:
being transmitted in the first network, indicating that the data transport starting information is relevant with the first network.
indicating that the network in which the data transport starts is the first network.
the data transport stopping information related to the second network, wherein the data transport stopping information may be transmitted in at least one of the following ways:
being transmitted in the second network, indicating that the data transport stopping information is relevant with the second network.
indicating that the network in which the data transport stops is the second network.
the data transport switching information
the target network to which the data transport switches may be set as the first network.
the source network from which the data transport switches may be set as the second network.

Although the above illustration has been made to the predetermined condition and the corresponding operation by taking the first network as an example, it should be understood that the present disclosure is not limited to this, similarly, the predetermined condition and the corresponding operation may also be a condition and an operation for the second network, for example, the predetermined condition may also be a data transport starting condition for the second network, a data transport stopping condition for the second network, and radio access capacity information of the UE.

With the above method, when the UE is ready to move out of the first network and move into the second network, the first node may transmit data transport stopping information to the common user plane data endpoint. The common user plane data endpoint may stop transmitting UE data to the first network and cache the UE data after receiving the information. Once the UE accesses to the second network and establishes a session channel, the common user plane data endpoint then transmits data to the UE via the second network. In this way, the data loss during the movement of the UE may be effectively reduced, and especially for a single radio-access UE. In some embodiments, the first node may also determine whether to initiate the corresponding operations according to the aforementioned access capacity information of the UE.

In some embodiments, the UE has dually attached to two networks and establishes session channels to the common user plane data endpoint respectively. For instance, if the UE moves into the second network from the first network and then moves back to the first network from the second network, the UE had established a session channel in the first network. If the UE moves back and forth between the two networks, there will not be a new session establishment signaling. At this point, the first node may transmit the data transport starting information to help the common user plane data endpoint to determine the network or the session channel for the data transport. For example: the common user plane data endpoint may stop the data transport to the second network after receiving the data transport starting information, and again transmit downlink data to the data channel of the first network, thus the data loss may be avoided.

In some embodiments, the data transport command information may be transmitted by using a singling message of the control plane or the data of the user plane (for example, the data transport command information may be transmitted in a header of UE data).

In some embodiments, the data transport starting information may be a data packet transmitted in the session channel or the network in which the data transport is determined to start, and upon the data packet is received, the user plane data endpoint may start the data transport of the session channel or the network in which the data packet is received.

In some embodiments, the data transport command information may be transmitted by using a signaling message of a control plane or data of a user plane, for example, the signaling message or the data packet of the control plane may include data transport command information (such as NAS PDU), and the header of UE data may also include the data transport command information.

In some embodiments, the first node transmits the data transport command information to at least one of a user plane data endpoint, a core network node, a radio access network node and an UE. When the first node is a radio access network node, the first node may transmit the data transport command information to the core network node and then the data transport command information is transmitted to the user plane data endpoint via the core network node.

Figure 4B:
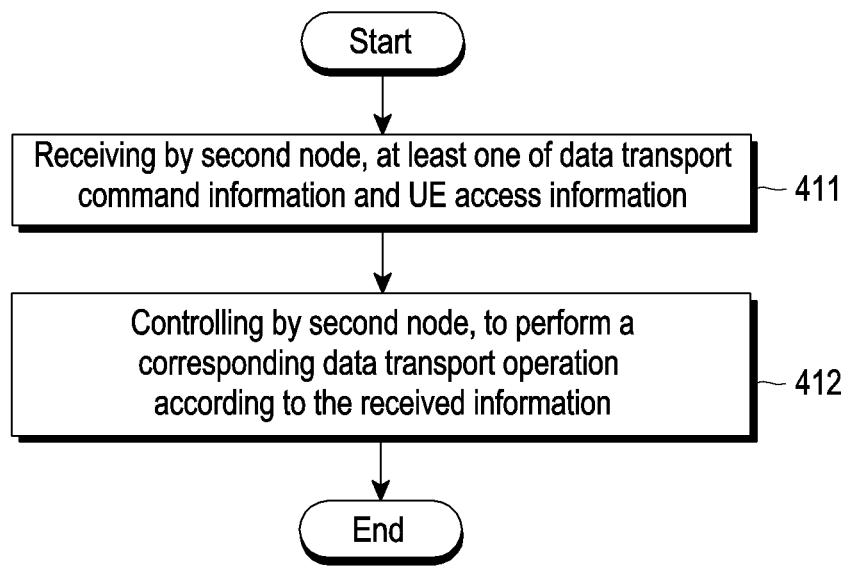
FIG. 4B is a flowchart diagram of a method for data transport control between wireless network systems according to another exemplary embodiment of the present disclosure.

FIG. 4B is a flowchart diagram of a method for data transport control between wireless network systems according to another exemplary embodiment of the present disclosure. As shown in FIG. 4B, the flowchart includes:

In step 411, the second node receives at least one of the data transport command information and the UE access information.

The data transport command information and the UE access information have been described in details with reference to FIG. 4A, thus the description thereof are omitted here.

Alternatively, the second node may receive the data transport command information and/or the UE access information from at least one of an UE, a radio access network node, a core network node and a user plane data endpoint.

In some embodiments, the second node may include at least one of a user plane data endpoint, an UE, a core network node, and a radio access network node.

In step 412, the second node controls a corresponding data transport operation according to the received at least one of the data transport command information and the UE access information.

Alternatively, the corresponding data transport operation includes an operation of starting the data transport or an operation of stopping the data transport.

Alternatively, the second node may start the data transport operation under at least one of the following conditions:
Start the data transport of a first network (or a second network) if the data transport starting information is received from the first network (or the second network).
Start the data transport of a first session channel if the data transport starting information is received from the first session channel.
Start the data transport of a network indicated by the data transport starting information if the data transport starting information is received.

Start the data transport of a session channel indicated by the data transport starting information if the data transport starting information is received, Start the data transport of a network which does not receive the data transport stopping information.

Start the data transport of a session channel which does not receive the data transport stopping information.

Start the data transport of a network not indicated by the data transport stopping information if the data transport stopping information is received.

Start the data transport of a session channel not indicated by the data transport stopping information if the data transport stopping information is received.

Start the data transport of the channel of the target network or the target session channel indicated by the data transport switching information if the data transport switching information is received.

Start the data transport of a network or a session channel to which the UE accesses in the case that there is cached data if the UE access information is received and the network or the session channel to which the UE accesses is confirmed.

Alternatively, the second node may stop the data transport operation under at least one of the following conditions:

Stop the data transport of a first network (or a second network) if the data transport stopping information is received from the first network (or the second network).

Stop the data transport of a first session channel if the data transport stopping information is received from the first session channel.

Stop the data transport of a network indicated by the data transport stopping information if the data transport stopping information is received.

Stop the data transport of a session channel indicated by the data transport stopping information if the data transport stopping information is received.

Stop the data transport of a network which does not receive the data transport starting information. For example, the UE is connected to two networks, respectively, and starts to receive and transmit data in the first network. When the second node has received the data transport starting information in the second network, as for a single radio-access UE, it indicates that the UE has moved into the second network, thus the second node may stop the data transport of the first network.

Stop the data transport of a session channel which does not receive the data transport starting information.

Stop the data transport of a network not indicated by the data transport starting information if the data transport starting information is received.

Stop the data transport of a session channel not indicated by the data transport starting information if the data transport starting information is received.

Stop the data transport of the source network or the source session channel indicated by the data transport switching information if the data transport switching information is received.

Stop the data transport of a network or a session channel which the UE does not access to in the case that there is cached data if the UE access information is received and the network or session channel to which the UE accesses is confirmed.

With the above solutions, corresponding indicated data transport starting or stopping operation may be performed on a network or a session channel in which the indication is received by the second node. In this case, if there are only two session channels A and B, when the data transport of the channel A stops, the second node may automatically switch to the channel B to perform the data transport.

In addition, in some embodiments, if the data transport in the two channel stops, the second node may cache a downlink data packet when it receives the packet. Then, the second node may issue a data packet trigger paging to the two networks, respectively, and after the network to which the UE accesses is determined, the second node starts the data transport of the corresponding network again after receiving the data transport starting information.

Figure 5A:
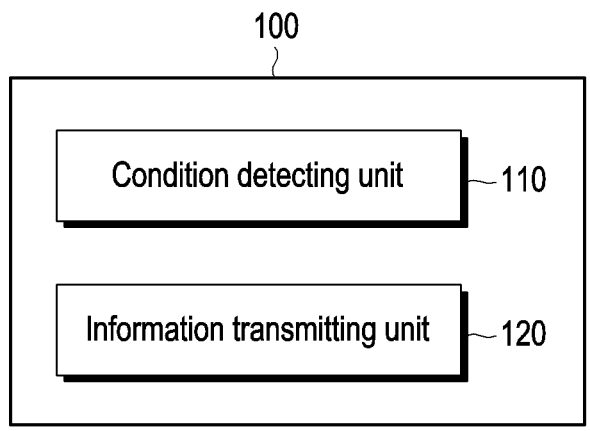
FIG. 5A is a block diagram of a first apparatus for data transport control between wireless network systems according to an exemplary embodiment of the present disclosure.

FIG. 5A is a block diagram of a first apparatus 100 for data transport control between wireless network systems according to an exemplary embodiment of the present disclosure.

As shown in FIG. 5A, the first apparatus 100 may include a condition detecting unit 100 and an information transmitting unit 120.

The condition detecting unit 110 may determine whether a predetermined condition is satisfied when the UE is in a dual attachment state with respect to the first and second networks. The predetermined condition may include at least one of a data transport starting condition for a certain network, a data transport stopping condition for the certain network, and an acquisition of radio access capacity information related to the access of the UE. The certain network may be one of the first and second networks.

In an exemplary embodiment of the present disclosure, the data transport starting condition for the certain network may include at least one of conditions that the user equipment accesses to the certain network; the user equipment leaves or is leaving other network other than the certain network; the user equipment leaves or is leaving another network of the first and second networks; the user equipment and the user plane data endpoint has established a session or a session channel via the certain network; and the user equipment and the user plane data endpoint has established a user equipment session or a session channel via other network other than the certain network.

Further, the data transport stopping condition for the certain network may include at least one of conditions that the user equipment leaves or is leaving the certain network, and the user equipment has accessed to other network other than the certain network.

In an exemplary embodiment of the present disclosure, the condition detecting unit 110 is configured to a processor or a controller processor such as a central processing unit (CPU) or an application processor (AP)) that can perform the corresponding operations by executing one or more software programs stored in a memory device. The processor (or the controller) is configured to a plurality of hardware or software elements connected thereto and may perform various data processing and operations by driving an operating system or an application program. The processor or the controller may be embodied as a system on chip (SoC).

The information transmitting unit 120 may transmit at least one of data transport command information and user equipment access information when the predetermined condition is satisfied.

In an exemplary embodiment of the present disclosure, the data transport command information may include at least one of data transport starting information, data transport stopping information, data transport switching information, target session channel information of the data transport, and an UE identification. The user equipment access information may include at least one of network information related to a network to which the user equipment accesses, session information related to a session to which the user equipment accesses, and channel information related to a session channel to which the user equipment accesses. Further, the data transport command information may be transmitted by using a signaling message of a control plane or data of a user plane.

In an exemplary embodiment of the present disclosure, the information transmitting unit 120 is configured to a transceiver. The transceiver may be implemented in software or hardware necessary to transmit the data transport command information.

Specific contents of operations, information, conditions and the like related to the first apparatus 100 have been illustrated in details in conjunction with FIG. 4A as above, thus for conciseness, no further description will be made here.

Figure 5B:
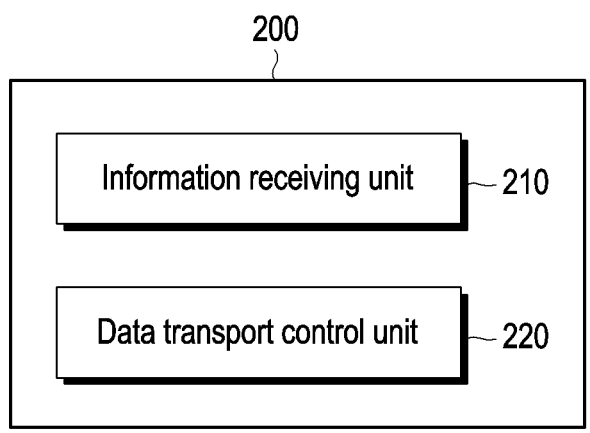
FIG. 5B is a block diagram of a second apparatus for data transport control between wireless network systems according to an exemplary embodiment of the present disclosure.

FIG. 5B is a block diagram of a second apparatus 200 for data transport control between wireless network systems according to an exemplary embodiment of the present disclosure.

As shown in FIG. 5B, the second apparatus 200 may include an information receiving unit 210 and a data transport control unit 220.

In an embodiment of the present disclosure, the information receiving unit 210 may receive at least one of data transport command information and user equipment access information.

In an exemplary embodiment of the present disclosure, the data transport command information may include at least one of data transport starting information, data transport stopping information, data transport switching information, target session channel information of the data transport, and an UE identification. The user equipment access information may include at least one of network information related to a network to which the user equipment accesses, session information related to a session to which the user equipment accesses, and channel information related to a session channel to which the user equipment accesses. Further, the data transport command information may be transmitted by using a signaling message of a control plane or data of a user plane.

In an exemplary embodiment of the present disclosure, the information receiving unit 210 is configured to a transceiver. The transceiver may be implemented in software or hardware necessary to receive the data transport command information.

The data transport control unit 220 may control to perform a corresponding data transport operation according to the at least one information received by the information receiving unit 210. The corresponding data transport operation may include an operation of starting the data transport or an operation of stopping the data transport.

In an exemplary embodiment of the present disclosure, the data transport control unit 220 is configured to a processor or a controller processor such as a central processing unit (CPU) or an application processor (AP)) that can perform the corresponding operations by executing one or more software programs stored in a memory device. The processor (or the controller) is configured to a plurality of hardware or software elements connected thereto and may perform various data processing and operations by driving an operating system or an application program. The processor or the controller may be embodied as a system on chip (SoC).

Specific contents of operations, information, conditions and the like related to the second apparatus 200 have been illustrated in details in conjunction with FIG. 4B as above, thus for conciseness, no further description will be made here.

Below, applications of the above data transport control method according to the exemplary embodiments of the present disclosure will be described in details with reference to FIGS. 6-11.

Figure 6:
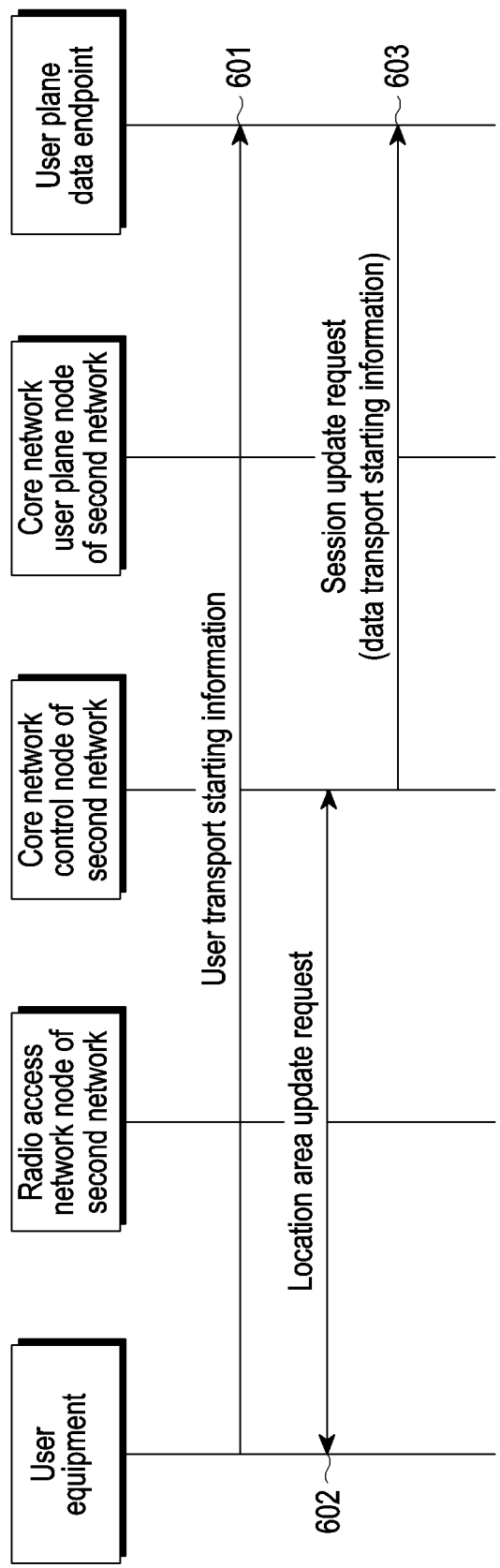
FIG. 6 is a schematic diagram of the first embodiment of a method for data transport control between wireless network systems according to an exemplary embodiment of the present disclosure.
Figure 7:
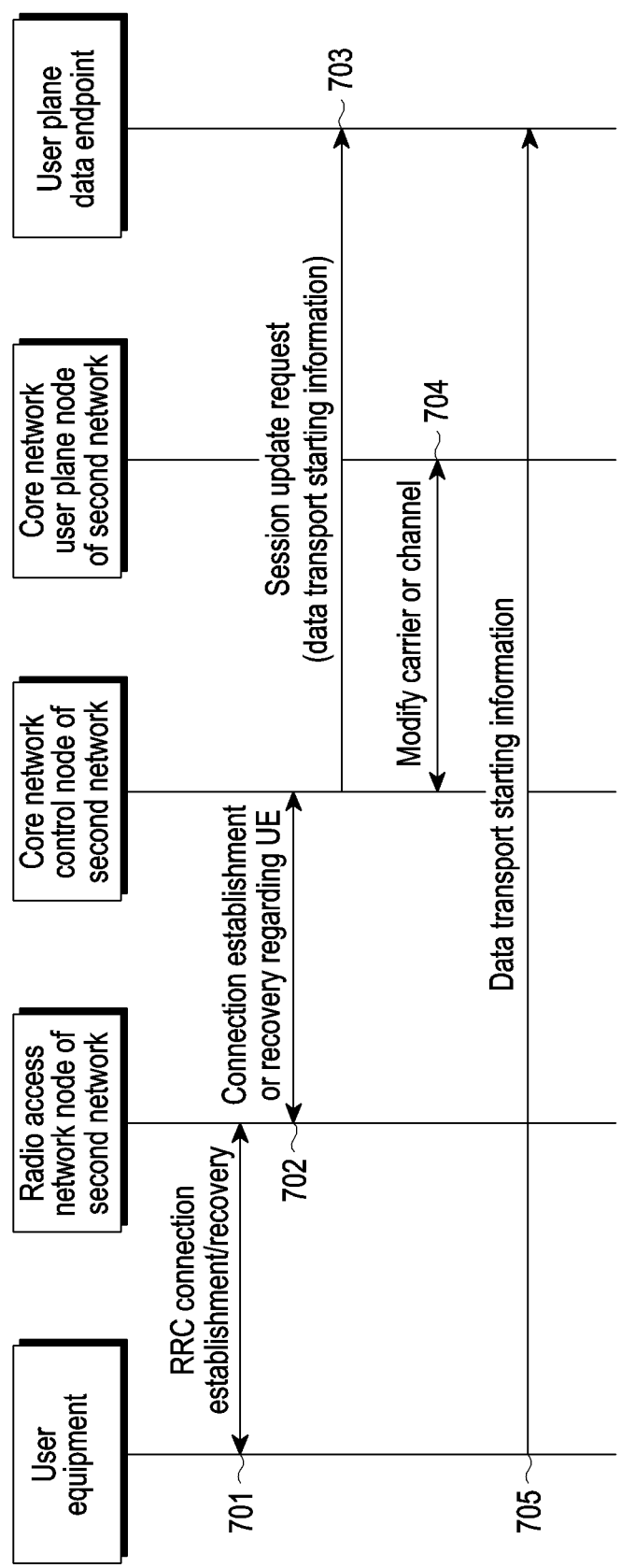
FIG. 7 is a schematic diagram of the second embodiment of a method for data transport control between wireless network systems according to an exemplary embodiment of the present disclosure.
Figure 8:
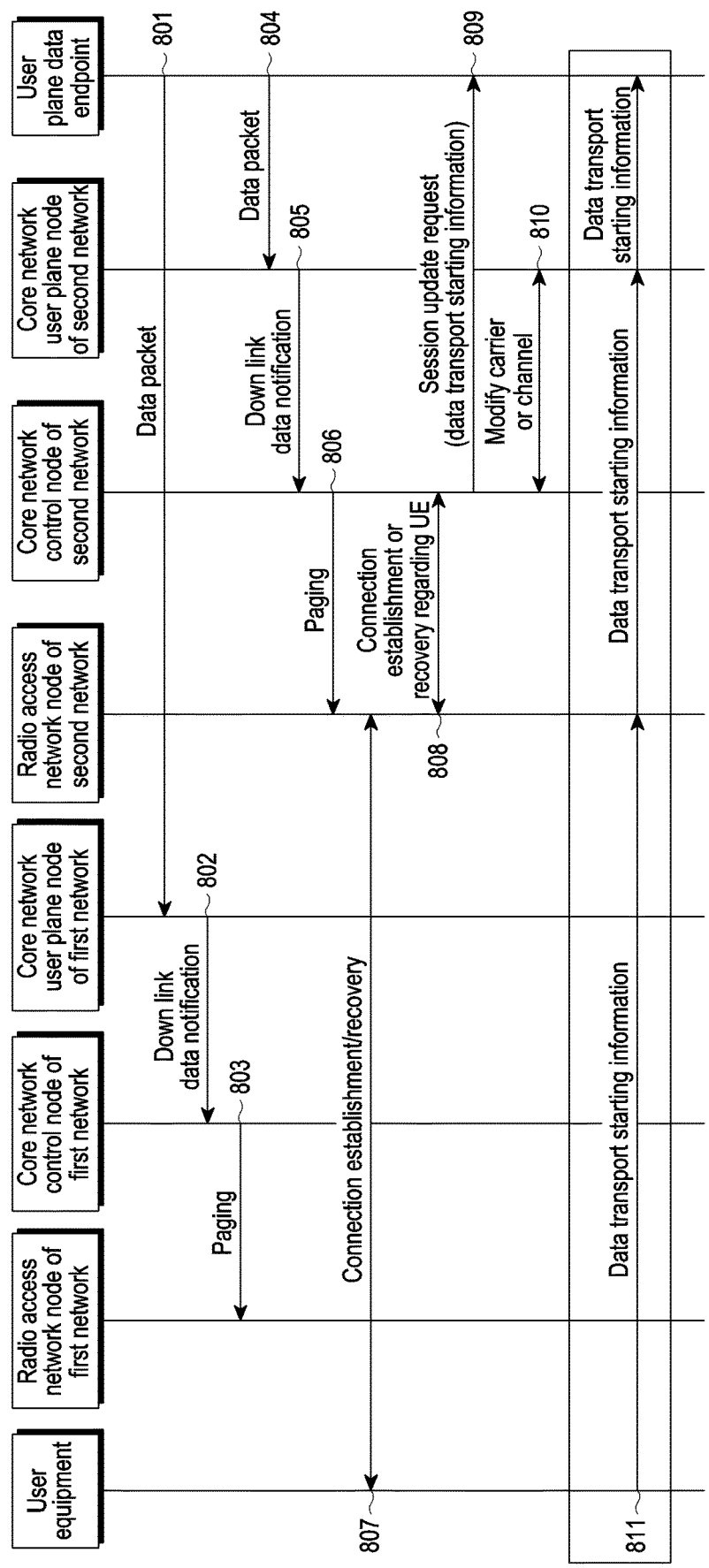
FIG. 8 is a schematic diagram of the third embodiment of a method for data transport control between wireless network systems according to an exemplary embodiment of the present disclosure.

FIGS. 6-8 are operations of starting the data transport. FIG. 6 illustrates that a UE accesses to a network and establishes a session channel, and when the UE leaves the network and then go back to the network, the session channel established by the UE still exists and is in an activated state, that is, a connection of the channel in a wireless side (RRC (Radio Resource Control) connection) is unreleased. At this point, a data packet is trigged through a UE data plane or a location update request is triggered on the control plane to inform the UE of accessing to the network. FIG. 7 illustrates that the UE accesses to a network and establishes a session channel, and when the UE leaves the network and then go back to the network, the session channel established by the UE still exists and is in an inactivated state, that is, a connection of the channel in the wireless side (RRC (Radio Resource Control) connection) is released. At this point, through the process of establishing the RRC connection, the core network knows that the UE accesses to it again, thus the core network may be triggered by itself.

Figure 9:
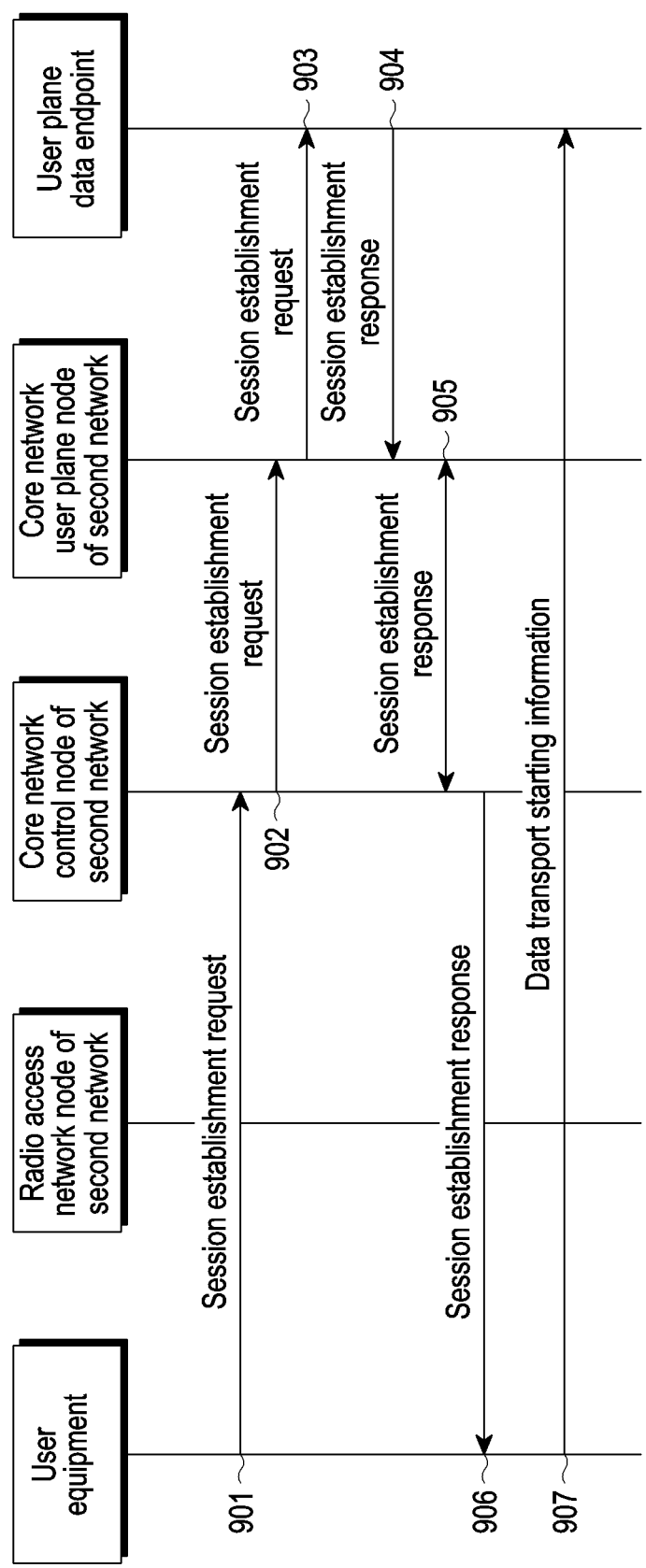
FIG. 9 is a schematic diagram of the fourth embodiment of a method for data transport control between wireless network systems according to an exemplary embodiment of the present disclosure.

FIG. 8 relates to paging, and FIG. 9 relates to establishment of the session channel.

FIG. 6 is a schematic diagram of the first embodiment of a method for data transport control between wireless network systems according to an exemplary embodiment of the present disclosure.

In FIG. 6, a UE has already been attached to the first and second networks simultaneously, and has established session channels in the two networks with the common user plane endpoint. That is, the common user plane endpoint may transmit data to the UE via the two session channels. When the UE accesses to the first network again, the session channels of the UE keep a connection, but there is no data transport. It is possible to request the user plane data endpoint to start the data transport of the session channel of the first network by any one of two methods, that is, method 1) by using data of the user plane, i.e., step 601; and method 2) by using data of the control plane, i.e., steps 602-603.

As shown in FIG. 6, the method includes:

in step 601, the UE moves into the first network, the UE may transmit an uplink data packet to the user plane data endpoint via the session channel of the first network. Alternatively, the header of the uplink data packet may include the data transport starting information or the UE access information (the data transport starting information and the UE access information have been described with reference to FIGS. 4A and 4B).

In step 602, the UE transmits a location area update request to the core network control node.

In step 603, with the location area update request of the UE, the core network control node knows that the UE has accessed to the network, and alternatively, the core network control node may transmit the data transport starting information or the UE access information to the user plane data endpoint.

The user plane data endpoint, after step 601 or 603, knows that there is a need to start the data transport of the UE in the first network or knows that the UE accesses to the first network, thus the user plane data endpoint may transmit the cached data in the session channel of the first network, and may also stop the data transport in the session channel of other network.

So far, the present embodiment ends, for conciseness, steps irrelevant to the object of the present embodiment are omitted in the description.

FIG. 7 is a schematic diagram of the second embodiment of a method for data transport control between wireless network systems according to an exemplary embodiment of the present disclosure.

As shown in FIG. 7, a UE is attached to the first network firstly, then is attached to the second network, and then goes back to the first network again. At this point, the session of the UE in the first network is established, but a radio connection between the UE and the first network has been released. It is possible to request the user plane data endpoint to start the data transport of the session channel of the first network by one of the following two methods, that is, method 1) by using data of the control plane, i.e., step 703; and method 2) by using data of the user plane, i.e., step 705.

As shown in FIG. 7, the method includes:

In step 701, a connection establishment/recovery between the UE and the radio access network node is performed.

In step 702, a connection establishment/recovery regarding the UE between the radio access network and the core network control node is performed.

In step 703, through the connection establishment/recovery regarding the UE between the radio access network and the core network control node, the core network control node knows that the UE has accessed to the network, and alternatively, the core network control node may transmit the data transport starting information or the UE access information to the user plane data endpoint (the data transport starting information or the UE access information have been described with reference to FIGS. 4A and 4B).

In step 704, a connection recovery regarding the UE between the radio access network and the core network user plane node is performed.

In step 705, the UE transmits an uplink data packet to the user plane data endpoint via the session channel of the first network. Alternatively, the header of the uplink data packet may include the data transport starting information or the UE access information.

The user plane data endpoint, after step 701 or 705, knows that there is a need to start the data transport of the UE in the first network or knows that the UE accesses to the first network, and the user plane data endpoint may transmit the cached data in the session channel of the first network, and may also stop the data transport in the session channel of other network.

So far, the present embodiment ends, for conciseness, steps irrelevant to the object of the present embodiment are omitted in the description.

FIG. 8 is a schematic diagram of the third embodiment of a method for data transport control between wireless network systems according to an exemplary embodiment of the present disclosure.

As shown in FIG. 8, a UE is attached to the first network firstly, and then is attached to the second network, and the UE is in idle state in both the two networks. The user plane data endpoint receives downlink data regarding the UE and may select the two networks to trigger the paging for the UE simultaneously or select one network to trigger the paging.

As shown in FIG. 8, the method includes:

In step 801, the user plane data endpoint (for example, TUPF, PGW) receives the downlink data packet, but the data transport of the UE in the session channels of the two networks are in stopped state. The user plane data endpoint caches the received downlink data packet and transmits one data packet (for example, the first received downlink data packet) to the core network user plane node of the first network to which the UE is attached. The user plane data endpoint may also transmit one data packet (for example, the first received downlink data packet) to the core network user plane node of the second network to which the UE is attached as shown in step 804.

In step 802, if the core network user plane node of the first network found that a connection regarding the UE with the radio access network node of the first network has been disconnected after receiving the data packet, it transmits a downlink data notification to the core network control plane node of the first network.

In step 803, the core network control plane node of the first network triggers a paging regarding the UE and transmits the same to the radio access network node of the first network. The radio access network node of the first network initiates the paging regarding the UE.

In step 804, the user plane data endpoint transmits one data packet to the core network user plane node of the second network to which the UE is attached.

In step 805, if the core network user plane node of the second network found that a connection regarding the UE with the radio access network node of second network has been disconnected after receiving the data packet, it transmits a downlink data notification to the core network control plane node of the second network.

In step 806, the core network control plane node of the second network triggers a paging regarding the UE and transmits the same to the radio access network node of the second network. The radio access network node of the second network initiates the paging regarding the UE.

The UE may respond to the paging regarding the UE in the first network or the second network. Subsequent steps 807 to 811 are identical with steps 701 to 705, thus the description thereof are omitted here.

FIG. 9 is a schematic diagram of the fourth embodiment of a method for data transport control between wireless network systems according to an exemplary embodiment of the present disclosure.

As shown in FIG. 9, a UE is attached to the first network firstly and then is attached to the second network. When the UE accesses to the second network, the UE has not established an UE session with the user plane data endpoint yet. It is possible to request the user plane data endpoint to start the data transport of the session channel of the second network by at least one of two methods, that is, method 1) by using data of the control plane, i.e., step 903; and method 2) by using data of the user plane, i.e., step 904.

As shown in FIG. 9, the method includes:

In step 901, the UE initiates a session establishment request to the core network control node of the second network after the UE accesses to the second network. The session establishment request may be included in an attached request message or a session establishment request message.

In step 902, the core network control node of the second network selects the common user plane data endpoint and initiates a session establishment request to the core network user plane node of the second network, to indicate information of selected common user plane data endpoint.

In step 903, the core network user plane node of the second network initiates a session establishment request to the common user plane data endpoint.

In step 904, the common user plane data endpoint initiates a session establishment response to the core network user plane node of the second network.

In step 905, the core network user plane node of the second network initiates a session establishment response to the core network control node of the second network.

In step 906, the core network control node of the second network initiates a session establishment response to the UE, and requests the radio access network node of the second network to establish a session channel regarding the UE.

In step 907, the UE transmits an uplink data packet to the user plane data endpoint via the session channel of the second network. Alternatively, the header of the uplink data packet may include the data transport starting information or the access information of the UE.

The user plane data endpoint, after step 903 or 907, knows that there is a need to start the data transport of the UE in the second network or knows that the UE accesses to the second network, thus the user plane data endpoint may transmit the cached data in the session channel of the second network, and may also stop the data transport in the session channel of other network.

Figure 10:
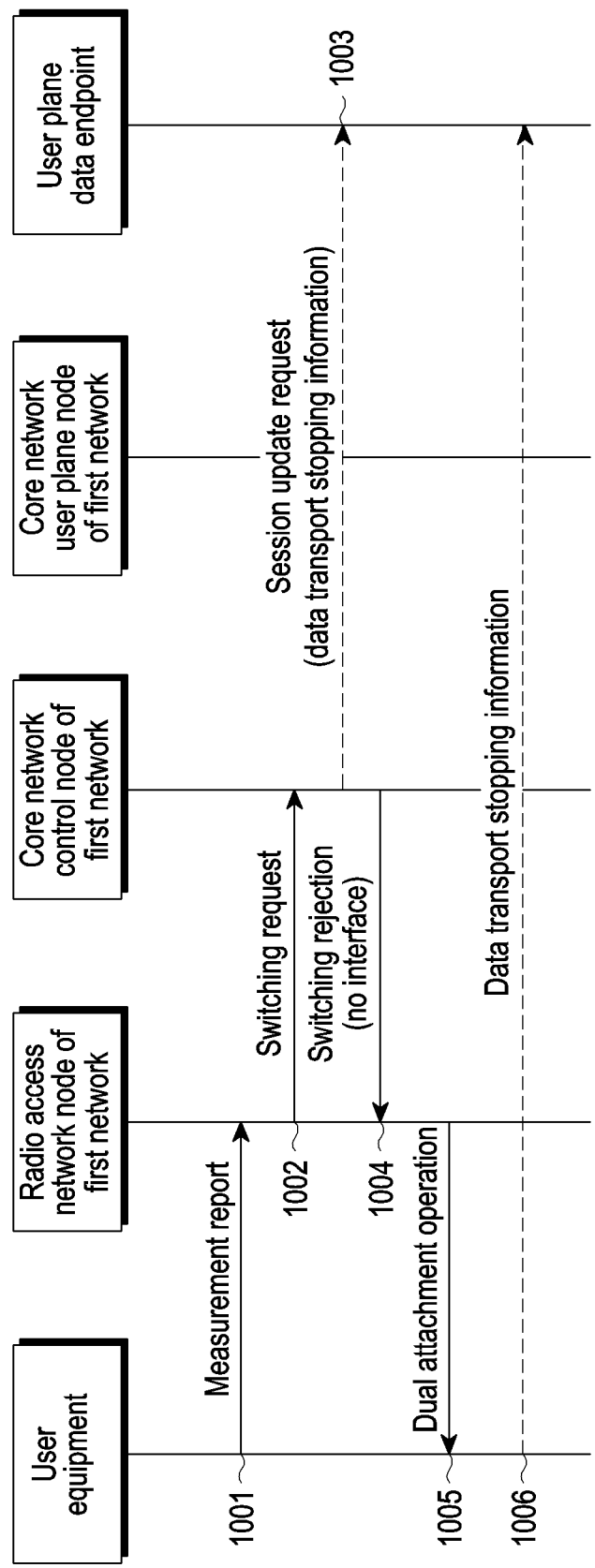
FIG. 10 is a schematic diagram of the fifth embodiment of a method for data transport control between wireless network systems according to an exemplary embodiment of the present disclosure.
Figure 11:
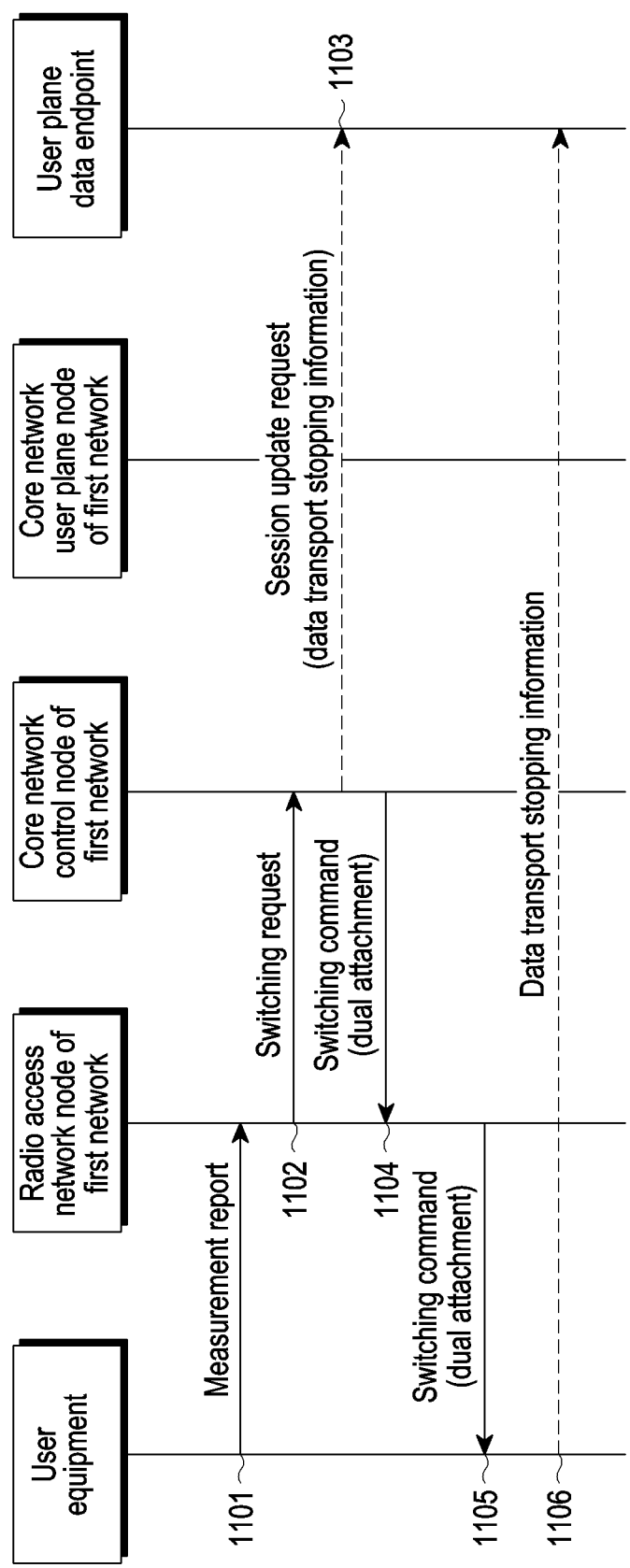
FIG. 11 is a schematic diagram of the sixth embodiment of a method for data transport control between wireless network systems according to an exemplary embodiment of the present disclosure.

FIGS. 10-11 illustrate cases of data transport stopping operation, that is, two embodiments of the method for deploying the UE to perform dual attachment.

FIG. 10 is a schematic diagram of the fourth embodiment of a method for data transport control between wireless network systems according to an exemplary embodiment of the present disclosure.

As shown in FIG. 10, a UE in connection state moves to the second network, and the radio access network node of the first network determines that the UE performs the dual attachment operation. The core network control node is requested to stop the data transport of the current network. The operation of requesting the core network control node to stop the data transport of the current network can be implemented by any one of the following four methods: 1) directly requesting when the switching starts, and the core network node performs a corresponding operation when it is determined that there is no interface; 2) when the radio access network node determines to perform the dual attachment, the core network is requested to perform a corresponding operation; 3) the radio access network node provides the capability of the UE, the core network node directly performs a corresponding operation when it finds that there is no interface and the UE is a single radio-access; and 4) beginning to request after the UE accepts the dual attachment operation.

In Step 1001, the UE reports a measurement report to the radio access network node of the first network. The radio access network node of the first network determines that a switching event occurs, and initiates a switching request to the core network control node of the first network. Alternatively, the request may include the data transport stopping information as described with reference to FIGS. 4A and 4B.

In step 1002, the radio access network node of the first network transmits a switching request to the core network node of the first network.

In step 1003, the core network node of the first network finds out that the target cell belongs to the second network. There is no interface between the first and second networks. Alternatively, the core network node of the first network may transmit the data transport stopping information as described with reference to FIGS. 4A and 4B to the common user plane data endpoint.

In step 1004, the core network control node of the first network returns a switching rejection to the radio access network node of the first network, the rejection reason is that there is no interface between the first and second networks.

In step 1005, the radio access network node of the first network determines whether the UE satisfies the predetermined condition regarding the dual attachment, and deploys the UE to perform the dual attachment operation. After the UE receives the operation, the UE may transmit an uplink data packet to the user plane data endpoint via the session channel of the first network. Alternatively, the header of the uplink data packet includes the data transport stopping information or the access information of the UE.

The user plane data endpoint, after step 1003 or 1005, knows that there is a need to stop the data transport of UE in the first network or knows that the UE will leave the first network or will access to the second network. Thus, it is possible to stop the data transport in the session channel of the first network and cache the data, and the data transport in the session channel of other network may be started, for example, a session channel in another network associated with the session channel of the UE in the first network or a second channel of the same session in other network (a first channel is in the first network).

FIG. 11 is a schematic diagram of the fifth embodiment of a method for data transport control between wireless network systems according to an exemplary embodiment of the present disclosure.

As shown in FIG. 11, a UE in connection state moves to the second network, and the core network node of the first network determines that the UE performs the dual attachment operation and requests the user plane data endpoint to stop the data transport of the current network.

In Step 1101, the UE reports a measurement report to the radio access network node of the first network.

In Step 1102, The radio access network node of the first network determines an occurrence of the switching event and initiates a switching request to the core network node of the first network.

In step 1103, the core network node of the first network finds out that the target cell belongs to the second network. There is no interface between the first and second networks. The radio access network node of the first network determines that the UE satisfies the predetermined condition regarding the dual attachment, and deploys the UE to perform the dual attachment operation, and the core network node may return a switching command to the radio access network node of the first network. Alternatively, the core network node of the first network sends the data transport stopping information as described with reference to FIGS. 4A and 4B to the common user plane data endpoint.

In step 1104, the core network node of the first network finds that the switching command is returned to the access network node of the first network.

In step 1105, the radio access network node of the first network sends the switching command. After the UE receives the command, the UE may transmit an uplink data packet to the user plane data endpoint via the session channel of the first network. Alternatively, the header of the uplink data packet includes the data transport stopping information or the access information of the UE.

The user plane data endpoint, after step 1103 or 1105, knows that there is a need to stop the data transport of the UE in the first network or knows that the UE will leave the first network or will access to the second network. Thus, it is possible to stop the data transport in the session channel of the first network and cache the data, the data transport in the session channel of other network may be started, for example, a session channel in other network corresponding to the session channel of the UE in the first network.

The above illustrations are merely explanations to the preferred embodiments and technical principles applied therein. Those skilled in the art will understand that the invention scope involved in the present application is not limited to the technical solution consisting of specific combinations of the above technical features, meanwhile, it should also covers other technical solution consisting of any combinations of the above technical features or the equivalent features thereof without departing from the inventive concept. For example, the technical solution is formed by replacing the above features with the technical features having similar functions as disclosed (but not limited to) in the present application.

The above described embodiments are merely preferred embodiments of the present disclosure, and cannot be used to limit the present disclosure. Any modifications, substitutions and improvements made within the spirit and principle of the present disclosure shall fall within the protection scope of the claims of the present disclosure.

What is claimed is:

1. A method performed by a user equipment (UE), the method comprising:
    identifying network access information of the UE for accessing a 5th-generation core network (5GC) in case that the UE is attached in an evolved packet core (EPC);
    transmitting, to an access and mobility management function (AMF), a request message for accessing the 5GC including UE identification information and the network access information of the UE; and
    transmitting, to the AMF, a non-access stratum (NAS) message for establishing a session with the 5GC, wherein the UE is attached in the 5GC and the EPC, or the 5GC.

2. The method of claim 1, further comprising:
    transferring a session established in the EPC to the 5GC while maintaining the same session information.

3. The method of claim 1,
    wherein the NAS message includes network information related to a session established in the EPC, network information related to the session established in the 5GC, and session information.

4. The method of claim 1, wherein transmitting, to the AMF, the request message for accessing the 5GC comprises:
    transmitting, network information related to a session established in the EPC.

5. The method of claim 1,
    wherein the session established in the 5GC corresponds to a protocol data unit (PDU) session.

6. The method of claim 1,
    wherein a session established in the EPC is released after establishing the session in the 5GC.

7. A method performed by an access and mobility management function (AMF), the method comprising:
    receiving, from a user equipment (UE), a request message for accessing a 5th-generation core network (5GC) including UE identification information and network access information of the UE in case that the UE is attached in an evolved packet core (EPC); and
    receiving, from the UE, a non-access stratum (NAS) message for establishing a session, wherein the UE is attached in the 5GC and the EPC, or the 5GC.

8. The method of claim 7, further comprising:
    transferring a session established in the EPC to the 5GC while maintaining the same session information.

9. The method of claim 7,
    wherein the NAS message including network information related to a session established in the EPC, network information related to the session established in the 5GC, and session information.

10. The method of claim 7, wherein receiving, from the UE, the request message for accessing the 5GC comprises:
    receiving, from the UE, network information related to a session established in the EPC.

11. The method of claim 7,
    wherein the session established in the 5GC corresponds to a protocol data unit (PDU) session.

12. The method of claim 7,
    wherein a session established in the EPC is released after establishing the session in the 5GC.

13. A user equipment (UE), the UE comprising:
    a transceiver; and
    at least one processor coupled with the transceiver and configured to:
        identify network access information of the UE for accessing a 5th-generation core network (5GC) in case that the UE is attached in an evolved packet core (EPC),
        transmit, to an access and mobility management function (AMF), a request message for accessing the 5GC including UE identification information and the network access information of the UE,
        transmit, to the AMF, a non-access stratum (NAS) message for establish a session with the 5GC, wherein the UE is attached in the 5GC and the EPC, or the 5GC.

14. The UE of claim 13, wherein the at least one processor is configured to:
    transfer a session established in the EPC to the 5GC while maintaining the same session information.

15. The UE of claim 13, wherein
    the NAS message includes network information related to a session established in the EPC, network information related to the session established in the 5GC, and session information.

16. The UE of claim 13, wherein the at least one processor is configured to:
    transmit network information related to a session established in the EPC.

17. The UE of claim 13,
    wherein the session established in the 5GC corresponds to a protocol data unit (PDU) session.

18. The UE of claim 13,
    wherein a session established in the EPC is released after establishing the session in the 5GC.

* * * * *